US012722154B2

(12) United States Patent
Liu et al.

(10) Patent No.: US 12,722,154 B2
(45) Date of Patent: Sep. 1, 2026

(54) MICROFLUIDIC CARTRIDGE

(71) Applicant: LifeOS Genomics Corporation, Grand Cayman (KY)

(72) Inventors: Timothy Z. Liu, Fremont, CA (US); Cheng-Chang Lai, Zhubei City (TW)

(73) Assignee: LifeOS Genomics Corporation, Grand Cayman (KY)

(*) Notice: Subject to any disclaimer, the term of this patent is extended or adjusted under 35 U.S.C. 154(b) by 761 days.

(21) Appl. No.: 18/162,211

(22) Filed: Jan. 31, 2023

(65) Prior Publication Data

US 2023/0256438 A1 Aug. 17, 2023

Related U.S. Application Data

(60) Provisional application No. 63/343,066, filed on May 17, 2022, provisional application No. 63/309,662, filed on Feb. 14, 2022.

(51) Int. Cl.
*B01L 3/00* (2006.01)

(52) U.S. Cl.
CPC . *B01L 3/502753* (2013.01); *B01L 2200/0689* (2013.01); *B01L 2300/0819* (2013.01); *B01L 2300/0867* (2013.01); *B01L 2300/161* (2013.01)

(58) Field of Classification Search
None
See application file for complete search history.

(56) References Cited

U.S. PATENT DOCUMENTS

| | | | |
|---|---|---|---|
| 2005/0229696 | A1 | 10/2005 | Takayama |
| 2011/0008223 | A1 | 1/2011 | Tsao et al. |
| 2011/0306081 | A1 | 12/2011 | Szita et al. |
| 2015/0153371 | A1 | 6/2015 | Morita et al. |
| 2016/0243548 | A1 | 8/2016 | Bhagat et al. |
| 2016/0258944 | A1 | 9/2016 | Wiktor |
| 2016/0375438 | A1 | 12/2016 | Marcy et al. |
| 2019/0224668 | A1 | 7/2019 | Cooney et al. |
| 2021/0387194 | A1 | 12/2021 | Goto et al. |

FOREIGN PATENT DOCUMENTS

| | | | |
|---|---|---|---|
| CN | 110653015 | A | 1/2020 |
| CN | 111909842 | A | 11/2020 |
| DE | 102005002990 | A1 | 8/2005 |
| JP | H0820396 | B2 | 3/1996 |
| JP | 2006518449 | A | 8/2006 |
| JP | 2007218716 | A | 8/2007 |

(Continued)

*Primary Examiner* — Lore R Jarrett
(74) *Attorney, Agent, or Firm* — SERVILLA WHITNEY LLC

(57) ABSTRACT

A microfluidic cartridge includes lower cartridge body, a biochip, and an upper cartridge body. The lower cartridge body includes a first substrate and an inlet column. The inlet column is protruding above the substrate and is hollow. The biochip has a plurality of microwells and is attached to the first substrate of the lower cartridge body. The upper cartridge is disposed over the lower cartridge body and includes a second substrate, a first opening, and a first O-ring. The first opening penetrates the second substrate, wherein the inlet column of the lower cartridge body is inserted into the first opening, and the inlet column and the first opening are assembled into an inlet port. The first O-ring is disposed in the first opening. The inlet port and the biochip are connected to by an inflow channel.

20 Claims, 16 Drawing Sheets

(56) References Cited

FOREIGN PATENT DOCUMENTS

| | | | |
|---|---|---|---|
| JP | 2008256379 | A | 10/2008 |
| JP | 2011505118 | A | 2/2011 |
| JP | 2013242247 | A | 12/2013 |
| JP | 2017501379 | A | 1/2017 |
| JP | 2017502687 | A | 1/2017 |
| JP | 2019509740 | A | 4/2019 |
| WO | 2017061619 | A1 | 4/2017 |
| WO | 2020172564 | A1 | 8/2020 |

160

162

200

200

MICROFLUIDIC CARTRIDGE

CROSS-REFERENCE TO RELATED APPLICATION

This application claims priority to U.S. Provisional Application Ser. No. 63/309,662, filed Feb. 14, 2022, and U.S. Provisional Application Ser. No. 63/343,066, filed May 17, 2022, which are herein incorporated by reference in their entirety.

BACKGROUND

Field of Invention

The present disclosure relates to a microfluidic cartridge for nucleic acid analysis to analyzing a biological sample(s).

Description of Related Art

Genetic analysis has been widely used for biomedical research and disease diagnostics, especially with the increasing availability of targeted therapies as part of routine healthcare, as precision medicine gradually becoming a reality around the globe. In order to further facilitate the routine use of genetic analysis in medical settings, digital PCR based assays provide advantages in terms of sensitivity, quantitation capability and ease of use, over traditional PCR or sequencing based technologies. Digital PCR holds great potential for liquid biopsy in disease early screening or diagnosis, especially when sample quantities are limited. However, at present, the flow control of fluid in automatic digital PCR equipment is still not ideal. For example, there may be a dead volume of the fluid in the device, and only one sample can be analyzed in one cartridge at a time.

SUMMARY

Some embodiments of the present disclosure provide a microfluidic cartridge that can be used on an automated digital PCR analyzer. With the arrangement of the upper cartridge body and the lower cartridge body, the fluid channel(s) in the microfluidic cartridge is better defined, and the fluid flow in the microfluidic cartridge can be controlled more accurately and automatically.

Some embodiments of the present disclosure provide a microfluidic cartridge including a lower cartridge body, a biochip, and an upper cartridge body. The lower cartridge body includes a first substrate and an inlet column. The inlet column is protruding above the first substrate and is hollow. The biochip is attached to the first substrate of the lower cartridge body. The upper cartridge body is disposed over the lower cartridge body and includes a second substrate, a first opening, and a first O-ring. The first opening penetrates the second substrate, wherein the inlet column of the lower cartridge body is inserted into the first opening, and the inlet column and the first opening are assembled into an inlet port. The first O-ring is disposed in the first opening and abuts against the inlet column of the lower cartridge body.

In some embodiments, the first O-ring abuts against the inlet column of the lower cartridge body.

In some embodiments, the microfluidic cartridge further comprises a reaction channel, and the reaction channel is defined by the bottom surface of the second substrate and the biochip.

In some embodiments, the microfluidic cartridge further comprises an inflow channel, the fluid inflow channel connects the inlet port and the reaction channel, and the fluid inflow channel is defined by the top surface of the first substrate and the bottom surface of the second substrate.

In some embodiments, the first O-ring abuts against the inlet column of the lower cartridge body.

In some embodiments, the first O-ring directly contacts a first inner wall in the first opening.

In some embodiments, the first O-ring is fixed in the first opening via mechanical restraints or adhesives.

In some embodiments, the lower cartridge body further comprises: an inflow trench and a biochip slot. The inflow trench is connected with the inlet column. The biochip slot is connected with the inflow trench, and the biochip is disposed in the biochip slot.

In some embodiments, the inflow trench has a first width, the biochip slot has a second width, and the first width is smaller than the second width.

In some embodiments, a top surface of the biochip is lower than a bottom surface of the inflow trench.

In some embodiments, the inflow trench is defined by welding lines.

In some embodiments, the biochip comprises a plurality of microwells, and the number of the microwells is at least 1,000.

In some embodiments, the second substrate of the upper cartridge body has a first thickness D1, and a depth of the inlet column inserted into the first opening is between about ⅓ D1 and D1.

In some embodiments, the lower cartridge body and the upper cartridge body are assembled by adhesive, ultrasonic welding, or mechanical fasteners.

Some embodiment of the present disclosure provides a microfluidic cartridge including a lower cartridge body, a biochip, and an upper cartridge body. The lower cartridge body includes a first substrate, an inflow trench, and a biochip slot. The inflow trench is disposed in the first substrate and extends in a first direction. The inflow trench and the biochip slot are connected. The biochip is disposed in the biochip slot. The upper cartridge body is disposed over the lower cartridge body and includes a second substrate, a first opening, an optical window, a plurality of sample injection ports, and at least one reaction channel spacer. The inflow trench and a bottom surface of the second substrate define a fluid inflow channel. The first opening penetrates the second substrate and connects the inflow channel. The optical window is disposed over the biochip, wherein a lower surface of the optical window and the biochip define a reaction channel. The plurality of sample injection ports are disposed between the first opening and the optical window in the first direction. The at least one reaction channel spacer is disposed on a lower surface of the upper cartridge body, wherein the at least one reaction channel spacer extends in the first direction and divides the reaction channel into a plurality of reaction sub-channels.

In some embodiments, each of the plurality of the sample injection ports is disposed in a respective sub-channel of the plurality of reaction sub-channels.

In some embodiments, the inflow trench is a triangle in a top view.

In some embodiments, the microfluidic cartridge for digital PCR further comprises at least one inflow channel spacer. The at least one inflow channel spacer is configured to divide the fluid inflow channel into a plurality of fluid inflow sub-channels.

In some embodiments, the microfluidic cartridge for digital PCR further comprises a first O-ring. The first O-ring is disposed in the first opening and abuts against the inlet column of the lower cartridge body.

In some embodiments, each of the plurality of sample injection ports is sealable by a sealing element.

In some embodiments, the microfluidic cartridge for digital PCR further comprises a plurality of injection port O-rings. The plurality of injection port O-rings are respectively disposed in the plurality of the sample injection ports.

Some embodiment of the present disclosure provides a microfluidic cartridge including a lower cartridge body, an upper cartridge body, and a biochip. The lower cartridge body comprises a first substrate, an inflow trench, and a biochip slot. The inflow trench is disposed in the first substrate. The inflow trench and the biochip slot are connected. The upper cartridge body is disposed over the lower cartridge body and comprises a second substrate, a first opening, an optical window, and a second opening. The inflow trench and a bottom surface of the second substrate define a fluid inflow channel. The first opening penetrates the second substrate and connects to the fluid inflow channel. The biochip is disposed in the biochip slot and under the optical window, wherein the biochip has a plurality of microwells, a lower surface of the optical window and the biochip define a reaction channel, and an upper surface of the biochip is lower than a bottom surface of the inflow trench.

In some embodiments, each of the bottom surfaces of the microwells is hydrophilic.

In some embodiments, the biochip comprises a silicon layer, and the plurality of microwells are recesses of the silicon layer.

In some embodiments, the biochip comprises a thermal conductive layer and a patterned layer. The patterned layer is disposed on the thermal conductive layer. The patterned layer comprises a plurality of through holes.

In some embodiments, the thermal conductive layer comprises gold, copper, aluminum, iron, steel, silicon, graphite, or graphene; the patterned layer comprises glass, silicon, or polymer.

BRIEF DESCRIPTION OF THE DRAWINGS

The disclosure of the application can be more fully understood by reading the following detailed description of the embodiment, with reference made to the accompanying drawings as follows.

DETAILED DESCRIPTION

Figure 1:
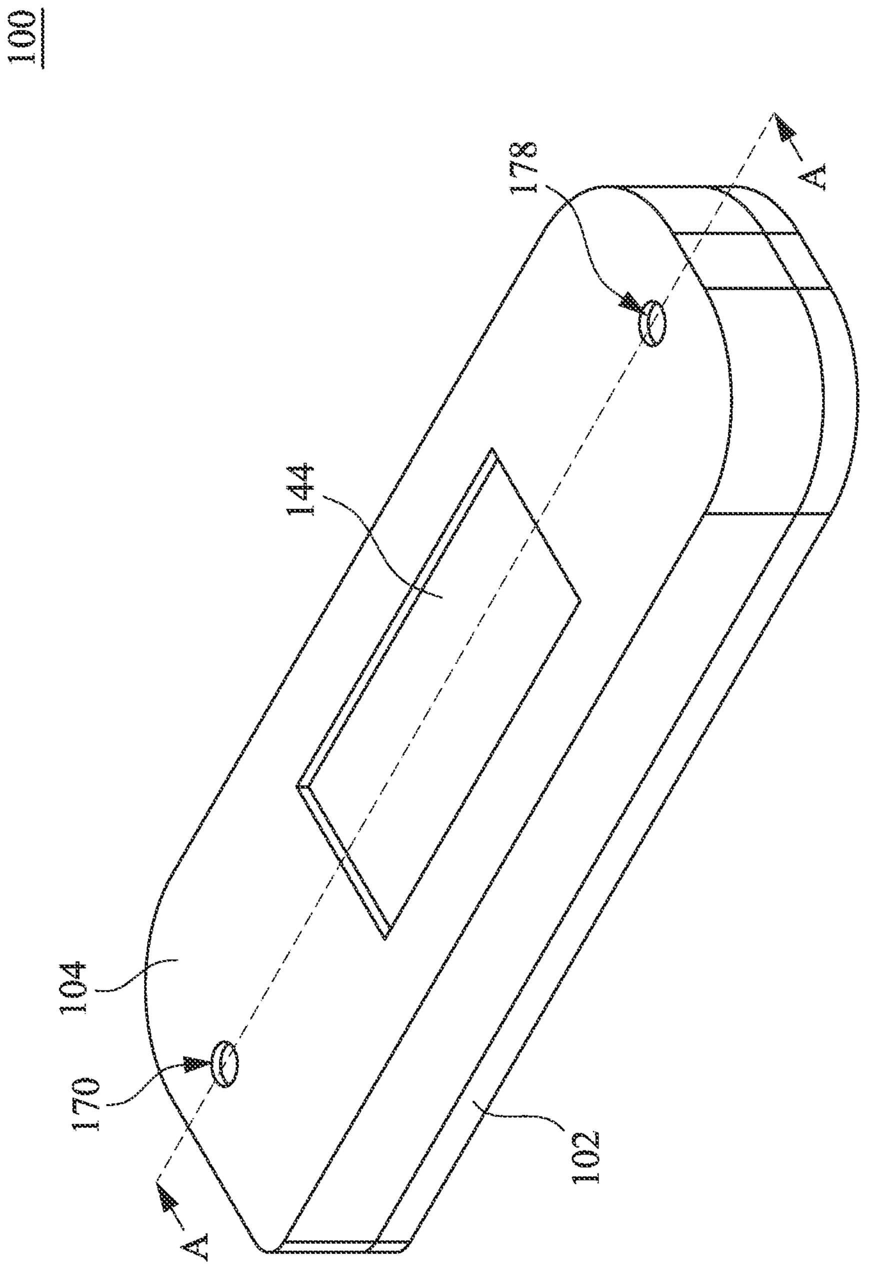
FIG. 1 is a perspective view of a microfluidic cartridge according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

In some embodiments, the microfluidic cartridge is used in digital PCR analysis of genetic variations of biological samples, wherein the samples are divided into a large number of individual PCR reactions for accurate quantitation of low abundance target variants.

Figure 2A:
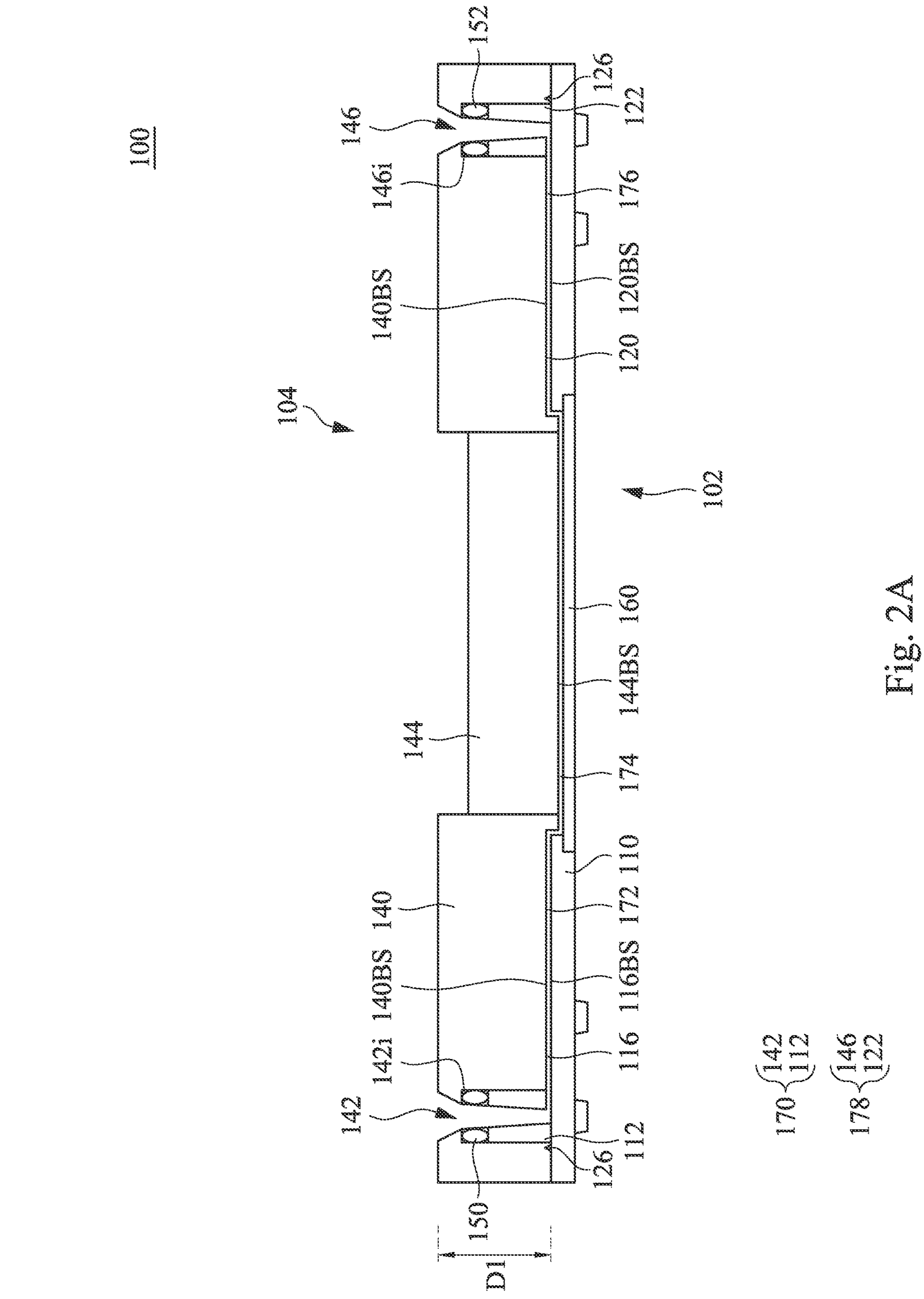
FIG. 2A is a cross-sectional view of a microfluidic cartridge according to some embodiments of the present disclosure.
Figure 2B:
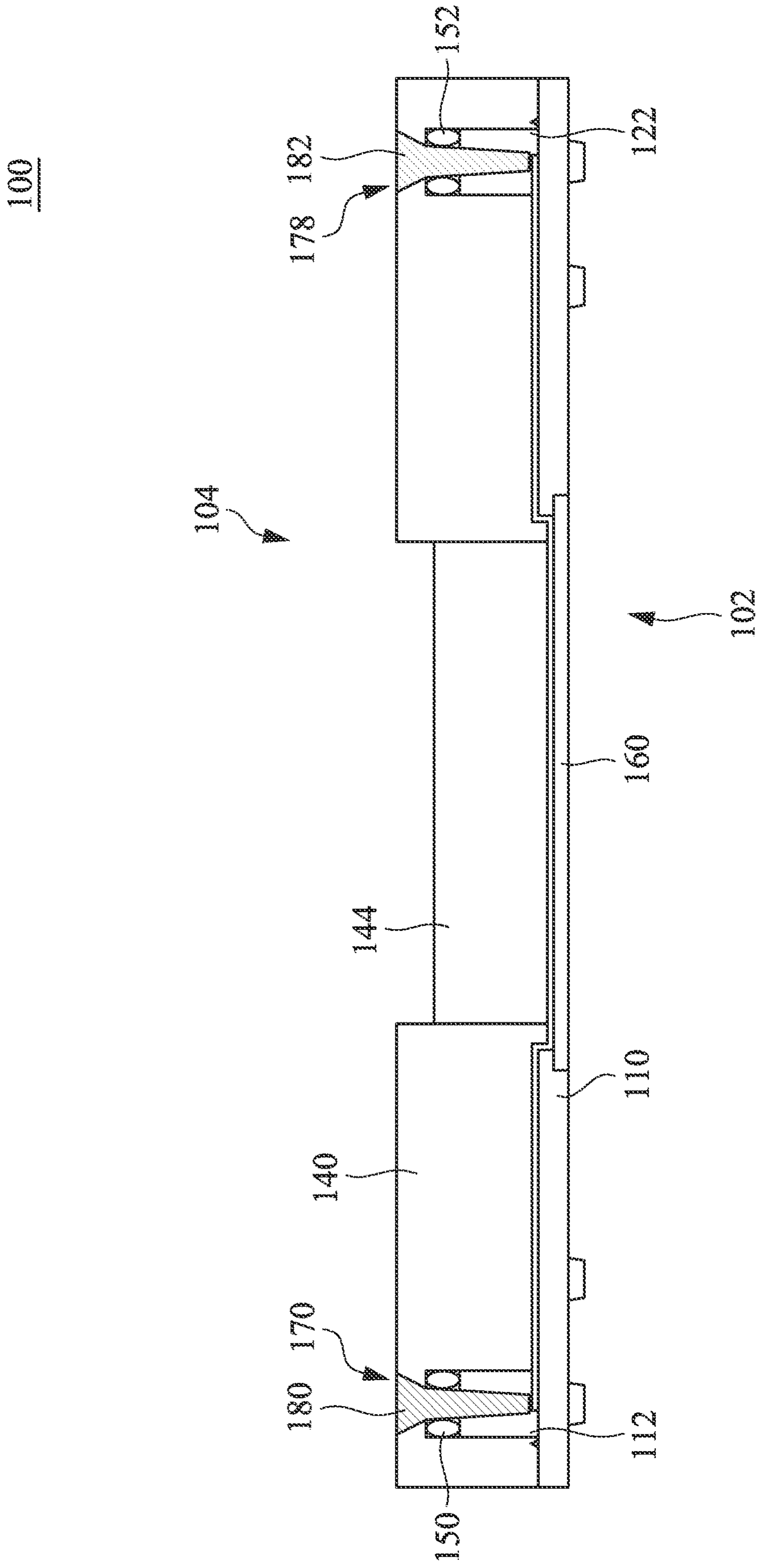
FIG. 2B is a cross-sectional view of a microfluidic cartridge according to some embodiments of the present disclosure.

FIGS. 1, 2A, and 2B illustrate a microfluidic cartridge according to some embodiments of the present disclosure. FIG. 1 is a perspective view, and FIGS. 2A and 2B are cross-sectional views along line A-A of FIG. 1.

Referring to FIG. 1, a microfluidic cartridge 100 comprises a lower cartridge body 102 and an upper cartridge body 104. An inlet port 170 is disposed near one side of the microfluidic cartridge 100 and configured to transport the fluid related to digital PCR to the inside of the microfluidic cartridge 100, and the outlet port 178 is disposed near the opposite side of the microfluidic cartridge 100 and configured to discharge the fluid from the microfluidic cartridge 100. An optical window 144 is disposed between the inlet port 170 and the outlet port 178 and over a biochip (which is described in more detail below). The optical window 144 is configured to allow the reaction signals emitted from the microwells of the biochip to be transmitted, so that the reaction signals can be detected.

Referring to FIG. 2A, the lower cartridge body 102, the upper cartridge body 104, and a biochip 160 are assembled to form the microfluidic cartridge 100. After assembly, a fluid inflow channel 172 and a fluid outflow channel 176 is formed between the lower cartridge body 102 and the upper cartridge body 104, and a reaction channel 174 are formed between the biochip 160 and the optical window 144 of the upper cartridge body 104. In other words, a fluid channel (which comprises the fluid inflow channel 172, reaction channel 174, and the fluid outflow channel 176) is formed when the said lower and upper cartridge bodies 102, 104, together with the said biochip 160, are assembled together to produce the functional microfluidic cartridge 100, wherein the said fluid channel can be connected to an outside fluid control mechanism for material exchange of samples and reaction reagents that can be liquid, particles, gas or other forms of substance matters. The said fluid channel and fluid ports (which comprises the inlet port 170 and the outlet port 178) comprise the fluid communication conduit with outside devices that are used to affect the biological reactions occurring on the said biochip attached in the cartridge. The optical signal change of such biological reactions is detected through the optical window 144 of the upper cartridge body 104.

Figure 3A:
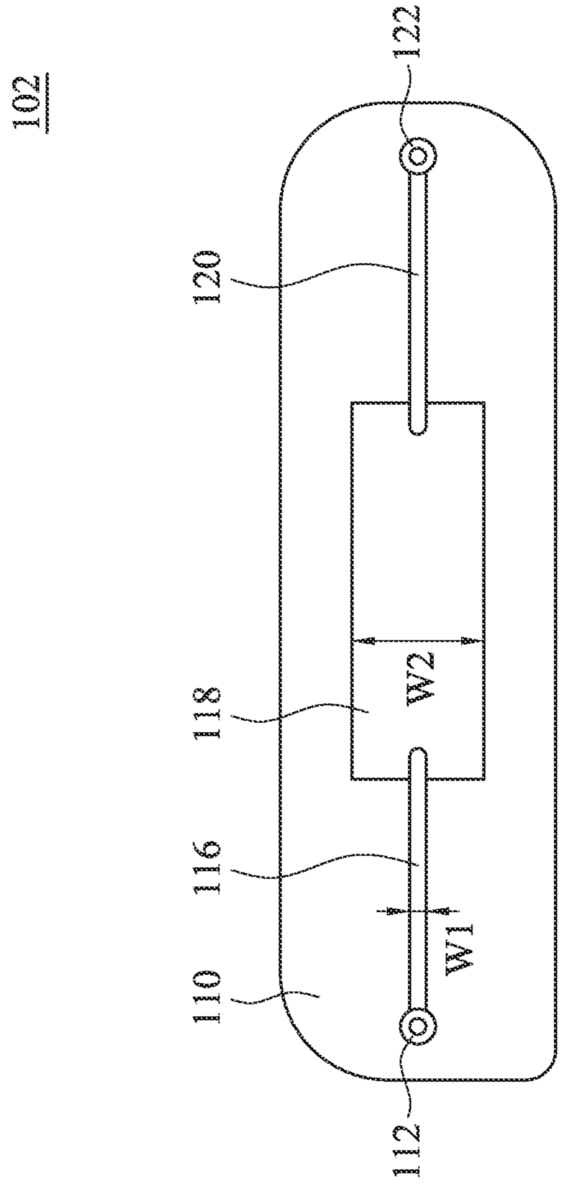
FIG. 3A is a top view of a lower cartridge body according to some embodiments of the present disclosure.

FIG. 3A illustrates a top view of the lower cartridge body 102. As shown in FIGS. 2A and 3A, the lower cartridge body 102 comprises a first substrate 110, an inlet column 112, an inflow trench 116, a biochip slot 118, an outflow trench 120, and an outlet column 122.

In some embodiments, the first substrate 110 of the lower cartridge body 102 comprises plastics, glasses, carbon, or metal. The fabrication of the lower cartridge body 102 can be achieved by various means, such as 3D printing, plastic injection molding, or Computer Numerical Control (CNC) machined parts.

Figure 3B:
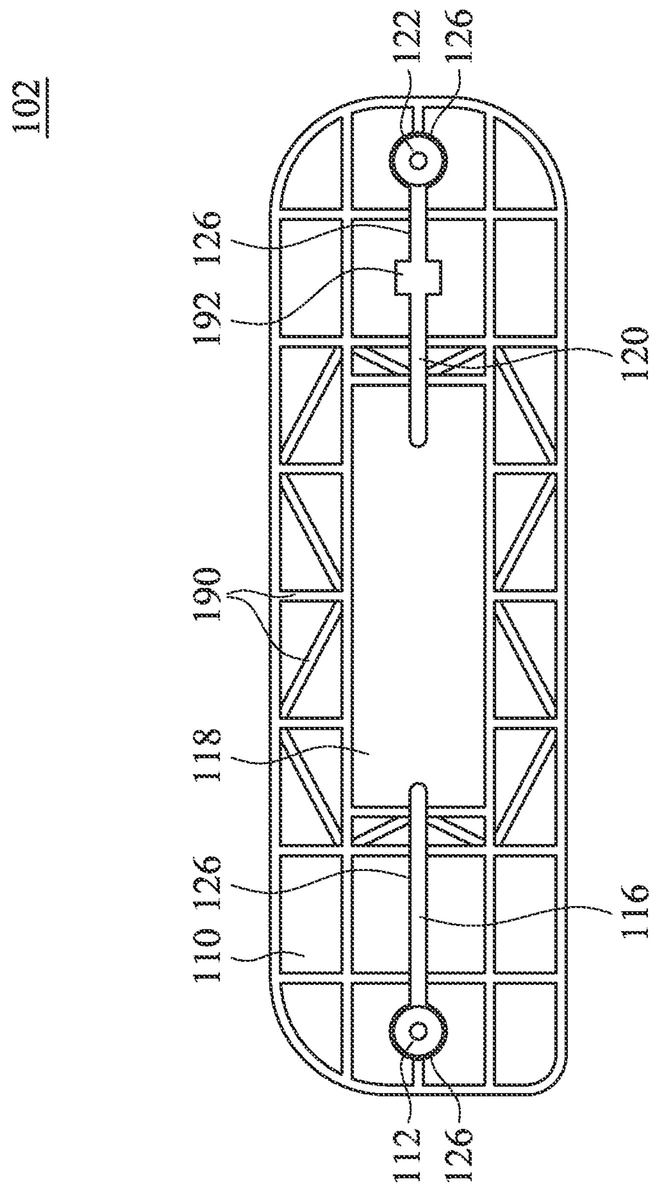
FIG. 3B is a schematic top view of a lower cartridge body according to some embodiments of the present disclosure.

FIG. 3B is another top view of the lower cartridge body 102. In some embodiments, the lower cartridge body 102 can be made with features, such as ribs 190, to enhance its mechanical strength and to minimize the distortion of the assembled cartridge during use.

Referring to FIG. 2A, the inlet column 112 is protruding above the first substrate 110. The inlet column 112 is a hollow structure. In addition, the outlet column 122 is also protruding above the first substrate 110. The outlet column 122 is a hollow structure.

As shown in FIGS. 2A and 3A, the inflow trench 116 is connected with the inlet column 112 and the biochip slot 118. In some embodiments, the inflow trench 116 is defined by two protruding lines on the first substrate 110. As shown in FIG. 2A, a bottom surface 116BS of the inflow trench 116 is higher than a top surface of the biochip 160.

Figure 5A:
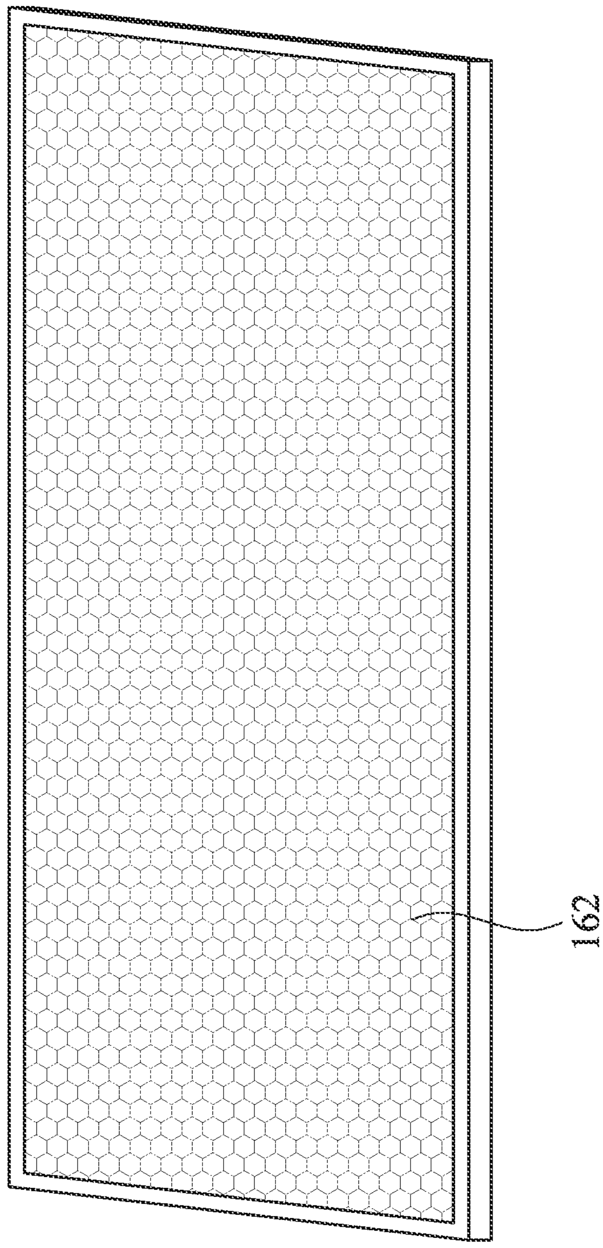
FIG. 5A is a perspective view of a biochip according to some embodiments of the present disclosure.

As shown in FIGS. 2A and 3A, the biochip 160 is disposed in the biochip slot 118 of the lower cartridge body 102. Referring to FIG. 5A which shows a perspective view of the biochip 160. The biochip 160 comprises a plurality of microwells, the number of the microwells may be at least 1,000, for example, 1,000, 5,000, 10,000, 50,000, 100,000, 200,000, 500,000, or the like.

As shown in FIGS. 2A and 3A, the outflow trench 120 is connected with the biochip slot 118 and the outlet column 122. In some embodiments, the outflow trench 120 is defined by two protruding lines on the first substrate 110. As shown in FIG. 2A, a bottom surface 120BS of the outflow trench 120 is higher than a top surface of the biochip 160.

Referring to FIG. 2A, the upper cartridge body 104 comprises a second substrate 140, a first opening 142, the optical window 144, and a second opening 146.

In some embodiments, the second substrate 140 of the upper cartridge body 104 comprises plastics, glasses, carbon or metal. The fabrication of the upper cartridge body 104 can be achieved by various means, such as 3D printing, plastic injection molding, or CNC machined parts. In some embodiments, the upper cartridge body 104 can be made with features, such as ribs, to enhance its mechanical strength and to minimize the distortion of the assembled cartridge during use.

As shown in FIG. 2A, the first opening 142 corresponds to the inlet column 112 of the lower cartridge body 102. The inlet column 112 is inserted into the first opening 142. The inlet column 112 of the lower cartridge body 102 and the first opening 142 of the upper cartridge body 104 are assembled into the inlet port 170. The inlet port 170 is configured to accommodate a pipette tip or a needle for transporting the fluid relating to digital PCR. As shown in FIG. 2A, the second substrate 140 of the upper cartridge body 104 has a first thickness D1. In some embodiments, a depth of the inlet column 112 inserting into the first opening 142 is between about ⅓ D1 and D1.

The optical window 144 is disposed over the biochip 160. The optical window 144 is made of transparent material.

As shown in FIG. 2A, the second opening 146 corresponds to the outlet column 122 of the lower cartridge body 102. The outlet column 122 is inserted into the second opening 146. The outlet column 122 of the lower cartridge body 102 and the second opening 146 of the upper cartridge body 104 are assembled into the outlet port 178. The outlet port 178 is configured to accommodate a pipette tip or a needle for transporting the fluid relating to digital PCR.

As shown in FIG. 2A, after the lower cartridge body 102, the biochip 160, and the upper cartridge body 104 are assembled, the fluid inflow channel 172 is defined by the inflow trench 116 and the bottom surface 140BS of the second substrate 140; the fluid outflow channel 176 is defined by the outflow trench 120 and the bottom surface 140BS of the second substrate 140.

In some embodiments, the assembly of the lower cartridge body 102 and the upper cartridge body 104 can be achieved by using adhesives, ultrasound welding, or mechanical fixtures.

Figure 4A:
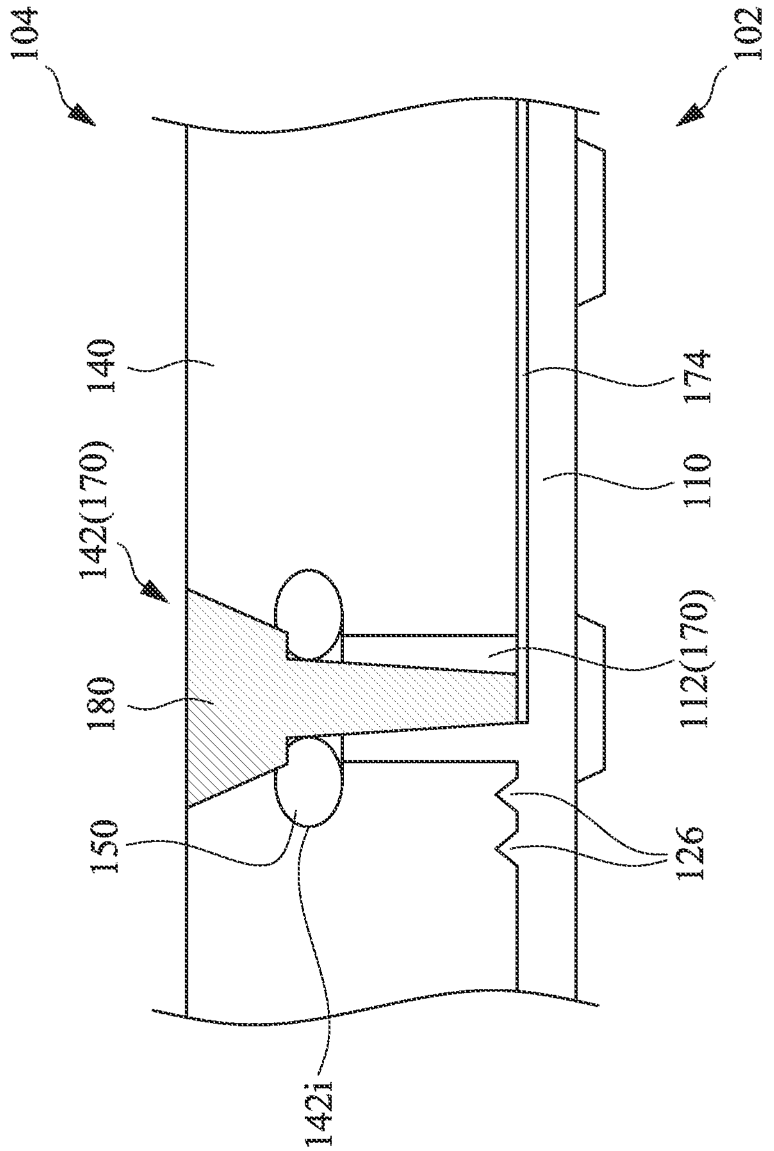
FIG. 4A is a cross-sectional view of a portion of a microfluidic cartridge according to some embodiments of the present disclosure.
Figure 4B:
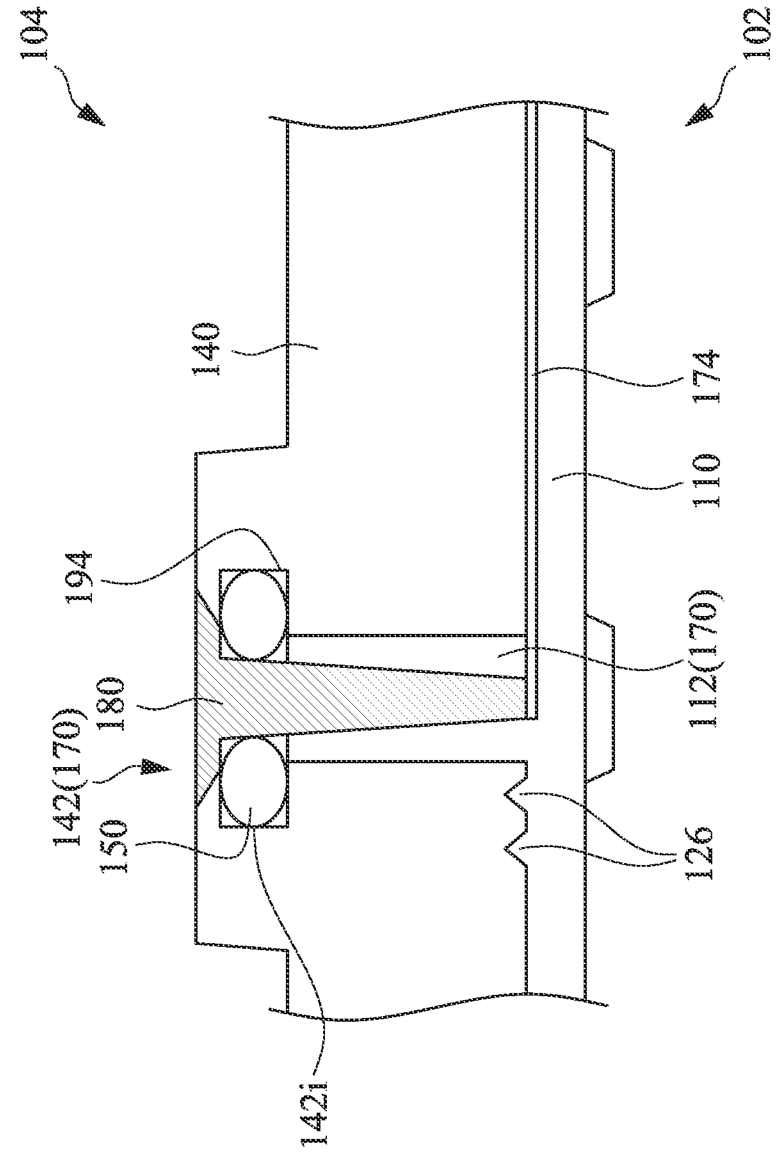
FIG. 4B is a cross-sectional view of a portion of a microfluidic cartridge according to some embodiments of the present disclosure.

Ultrasound welding is an often used means for bonding parts of compatible materials together, which is well established in the industry. Welding lines are used for joining the upper and lower cartridge bodies together during assembly of the microfluidic cartridge 100. In some embodiments, plastic upper and lower cartridge bodies are bonded by ultrasound welding. Welding lines can be designed into both the lower cartridge body 102 and the upper cartridge body 104 for tight bonding. In some embodiments, as shown in FIG. 3B, the welding lines 126 also define the inflow channel and the outflow channel in the lower cartridge body 102. The welding lines 126 can be of single welding line as shown in FIGS. 2A and 2B, or double welding lines, as shown in FIGS. 4A and 4B, for improved the air and liquid sealing quality of the fluid channels.

In some embodiments, dimensions of the fluid channel (which comprises the fluid inflow channel 172, reaction channel 174, and fluid outflow channel 176), which dictate the flow rate of fluids along the channels, is kept constant along the channel. In some embodiments, the feature and dimension of the fluid channels, which dictate the flow rate of fluids along the fluid channels, are varied according to the flow control needs. The variation in dimensions of different sections of the fluid channels depends on the intended use, especially for biological samples of small volumes. In some embodiments, the widths of the channels connecting to the fluid ports are significantly different from the channel over the biochip.

As shown in FIG. 3A, the inflow trench 116 has a first width W1, the biochip slot 118 has a second width W2, and the first width W1 is smaller than the second width W2.

In some embodiments, as illustrated in FIGS. 3A and 3B, fluid channels of 1 or 2 mm in width and 500 micrometer (μm) in height, defined by the welding lines 126, are connected to fluid ports in similar diameters at the connection joints on either side of the cartridge body; while the dimension of the channel becomes, for example, around 10 mm in width and less than 500 micrometer (μm) in height over the entire surface area of the attached biochip when the cartridge is assembled. The different sections of the channel are tightly connected for continuous liquid flow from the inlet port 170 at one end to the outlet port 178 at the other end of the microfluidic cartridge 100. In some embodiments, it is also conceivable that there are more than two fluid ports connected to the fluid channel in the microfluidic cartridge 100.

As shown in FIG. 3B, the outflow trench 120 comprises a passive valve 192 along the trench. The passive valve 192 is configured to regulate the flow rate of the fluid. By varying the dimension of the channel at certain locations, which helps regulate the flow rate of different fluids inside the fluid channel.

Referring to FIG. 2A, a first O-ring 150 is disposed in the first opening 142 of the upper cartridge body 104 and abuts against the inlet column 112 of the lower cartridge body 102. A second O-ring 152 is disposed in the second opening 146 of the upper cartridge body 104 and abuts against the outlet column 122 of the lower cartridge body 102. These elastic O-rings serve as sealing elements to maintain the fluid or air flow control through the channel when the microfluidic cartridge 100 is coupled to connecting instruments, e.g., automated pipette tips or needles. The flow control via the fluid ports can affect the biological reactions on the biochip by pressure control, exchange of reagents, and other means.

FIG. 2B illustrates a cross-section view of the microfluidic cartridge 100, a first pipette tip 180 is inserted into the inlet port 170, and a second pipette tip 182 is inserted into the outlet port 178. The elastic first and second O-rings 150, 152 serve as sealing elements respectively around the first and second pipette tips 180, 182.

Referring to FIG. 4A, which illustrates a cross-sectional view of the inlet port 170. In some embodiments, the first O-ring 150 is an integral part of the upper cartridge body 104. In other words, the first O-ring 150 directly contacts a first inner wall 142*i* in the first opening 142. The first O-ring 150 is fabricated as part of the upper cartridge body 104. For example, multiple materials can be used in plastic injection molding of the upper cartridge body 104.

Referring to FIG. 4B, which illustrates a cross-sectional view of the inlet port 170. In some embodiments, the first O-ring 150 is fixed in the first opening via mechanical restraints or adhesives. The first O-ring 150 is elastic and is fixed in the first opening 142 in the upper cartridge body 104 by an additional fastener 194. In some embodiments, the fixture of the first O-ring is attached to the upper cartridge body 104 by adhesive, screws, or other means.

The fluid ports having O-rings fixed in the upper cartridge body 104 function independently of the lower cartridge body 102. As shown in FIGS. 4A and 4B, the fluid ports can reduce residual dead volume when biological sample and other reagents are introduced into the fluid channel by outside instruments, such as automated pipette tips or needles.

Referring to FIG. 5A, which shows a perspective view of the biochip 160. In some embodiments, the biochip 160 is bonded to the lower cartridge body 102 by adhesives. The selection of adhesives for this purpose can be determined by the compatibility with the materials of the biochip and the cartridge body. The adhesive is required to form a liquid or airtight seal around the biochip during the sample analysis process. The biochip 160 can be of various materials and contain various features for specific applications.

Figure 5B:
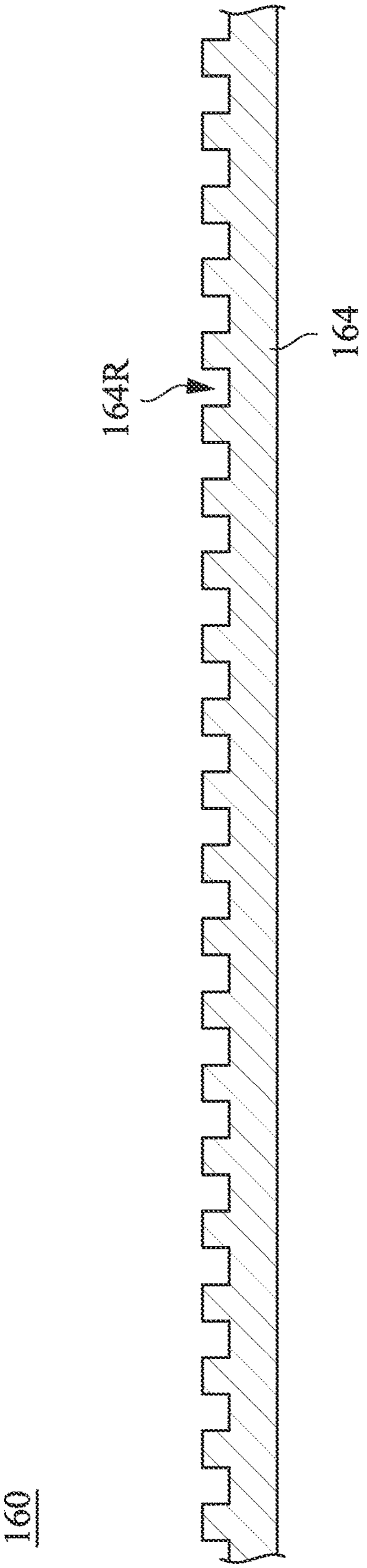
FIG. 5B is a cross-sectional view of a biochip according to some embodiments of the present disclosure.

FIG. 5B shows a partial cross-sectional view of the biochip. In some embodiments, the biochip 160 comprises a silicon layer 164, and the plurality of microwells 162 are recesses 164R of the silicon layer 164. In some embodiments, the biochip 160 is silicon-based and contains a matrix of hexagon-shaped reaction microwells, of the size between 10~200 μm, etched in the silicon substrate by semiconductor processing technology, such as wet-etching or dry-etching. In some embodiments, the surface of the microwells can also be derivatized by various means to make it hydrophilic, while keeping the surface of the walls between the microwells hydrophobic.

Figure 5C:
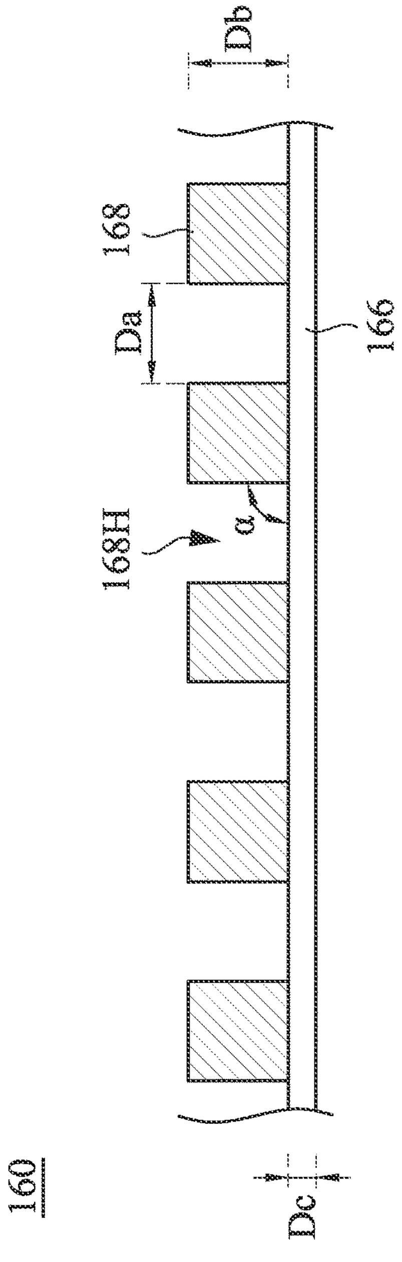
FIG. 5C is a cross-sectional view of a biochip according to some embodiments of the present disclosure.

FIG. 5C illustrates a partial cross-sectional view of the biochip. In some embodiments, the biochip 160 comprises a thermal conductive layer 166 and a patterned layer 168 disposed on the thermal conductive layer 166. The patterned layer 168 comprises a large number of through holes 168H. Because the thermal conductive layer 166 is affixed to one surface of the patterned layer 169, microwells 162 derived from the said through holes 168H are generated. Each of the microwells 162 has one end sealed by the thermal conductive layer 166. The attachment of the thermal conductive layer 166 to the bottom surface of the patterned layer 168 makes air-tight and liquid-tight seal on the bottom of each of the through holes 168H, with the other end of each of the through holes 168H open for liquid communication. The shape and size of the through holes 168H are compatible with liquid distribution and conducive to polymerase chain reaction.

In some embodiments, the dimension of the through holes 168H can range from 10 μm to 10000 μm across (labeled as Da in FIG. 5B) and 10 μm to 10000 μm in depth (labeled as Db in FIG. 5B). The thickness of the thermal conductive layer 166 can vary significantly depending on the mechanical strength and thermal conductivity of the material, for example, ranging from 10 μm to 1000 μm (labeled as Dc in FIG. 5B). The shape of the through holes 168H can vary from round, square to hexagon, etc. with varying wall angles a with respect to the bottom of the microwells. In some embodiments, the shape of the microwells is hexagonal, and the angle $\alpha$ is 90° as illustrated in FIG. 5B. Other geometric variations of the microwells are possible.

The material of the patterned layer 168 can be chosen from various materials known in the art for biological sample analysis, for example, glass, silicon, polymeric materials such as PMMA or polypropylene, etc. It can be of good or poor thermal conductive materials. The fabrication methods for making patterned through holes 168H in the patterned layer may be injection molding, CNC machining, and 3D printing, etc. The thermal conductive layer 166 comprises good thermal conductive materials known in the art, for example, metal such as gold, copper, aluminum, iron, stainless steel, silicon, carbon such as graphene or graphite, etc. Various methods known in the art for affixing the thermal conductive layer 166 to the patterned layer 168 of the biochip 160 can be used, such as adhesives or ultrasound welding.

The bottom surfaces of the microwells 162 of the biochip 160 and inner surfaces of the through holes 168H that make contact with the reaction mixtures during biological sample analysis are preferably hydrophilic. These surface areas can be modified or derivatized to enhance the hydrophilicity by various chemical modifications. The techniques for making surface may be, for example, plasma surface treatment, hydroxyl or carboxylate group attachment, hydrogel deposit on surface, etc.

Figure 6:
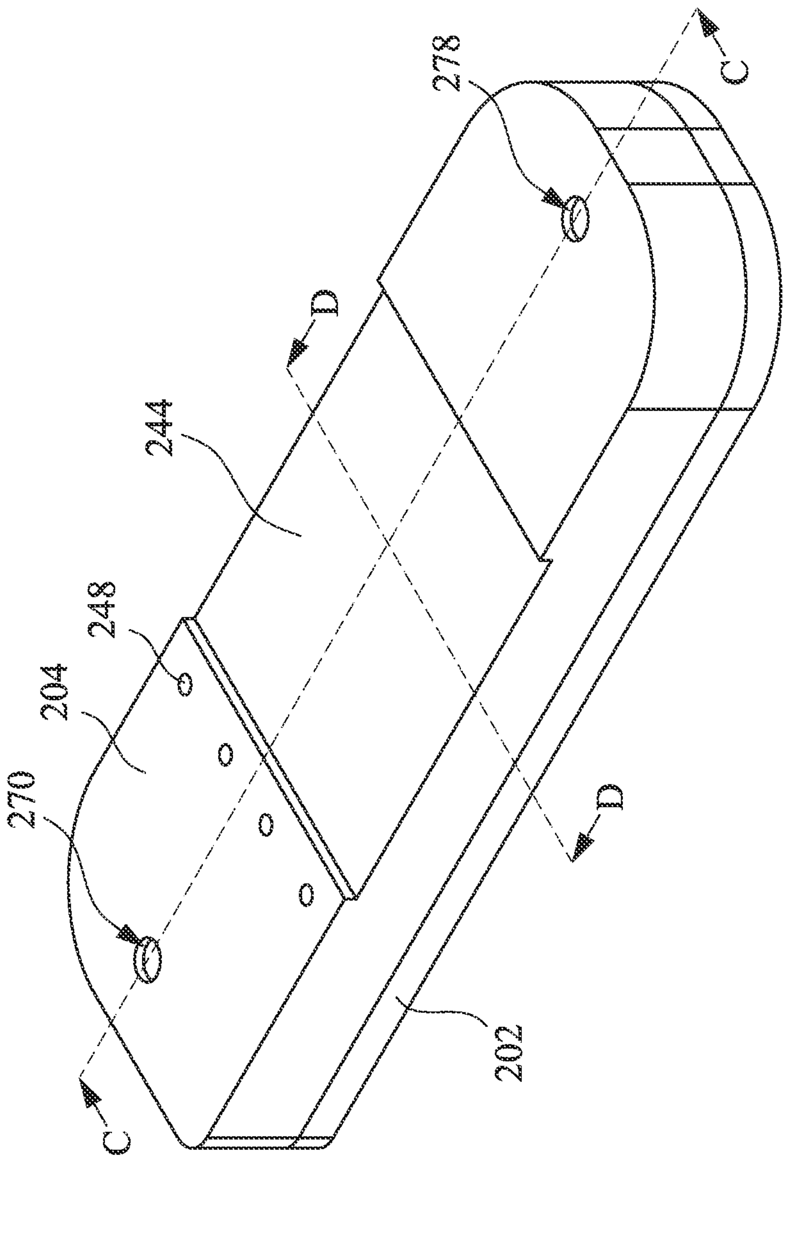
FIG. 6 is a perspective view of a microfluidic cartridge according to some embodiments of the present disclosure.
Figure 9A:
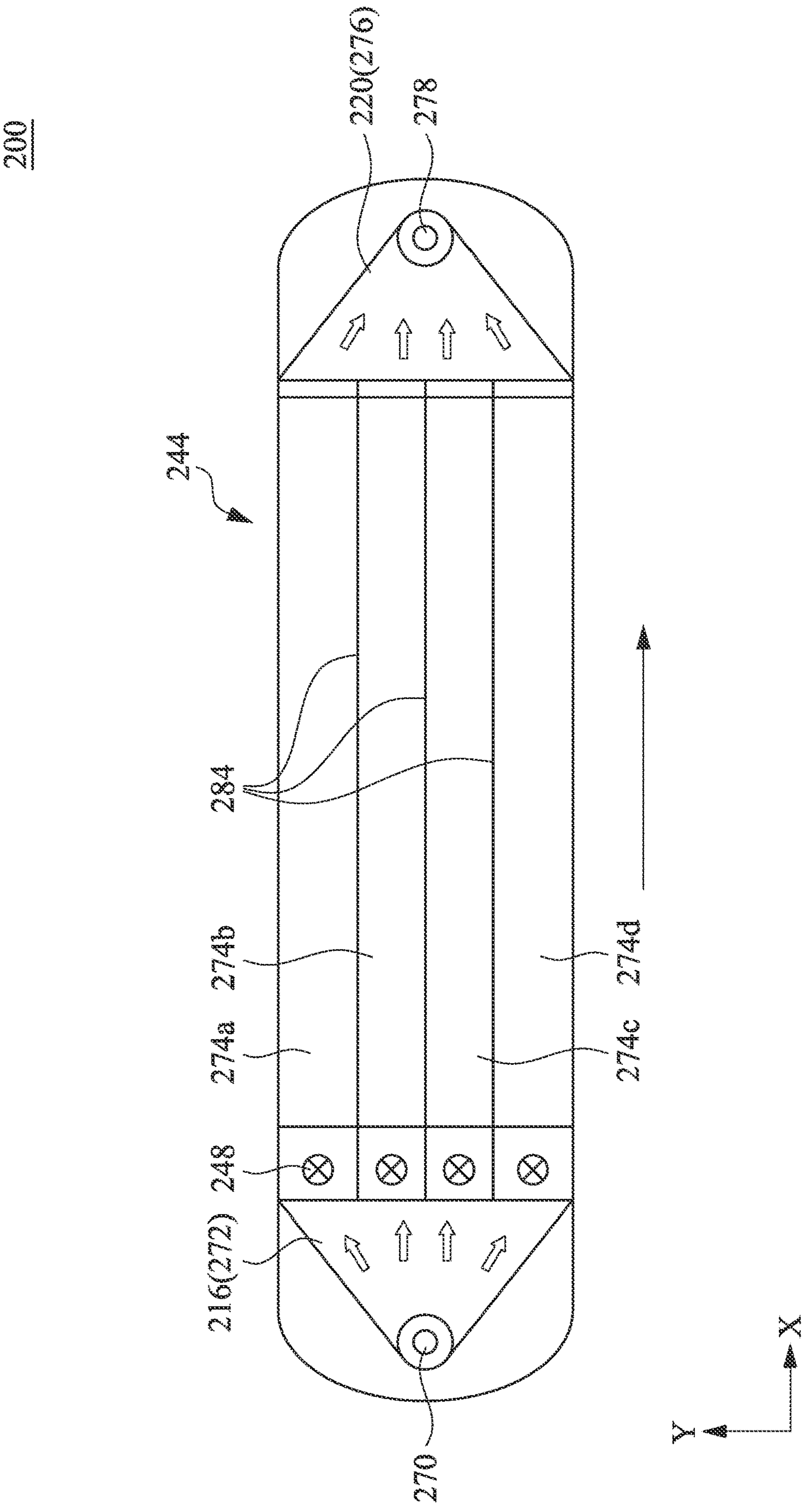
FIG. 9A is a top view of a microfluidic cartridge according to some embodiments of the present disclosure.
Figure 9B:
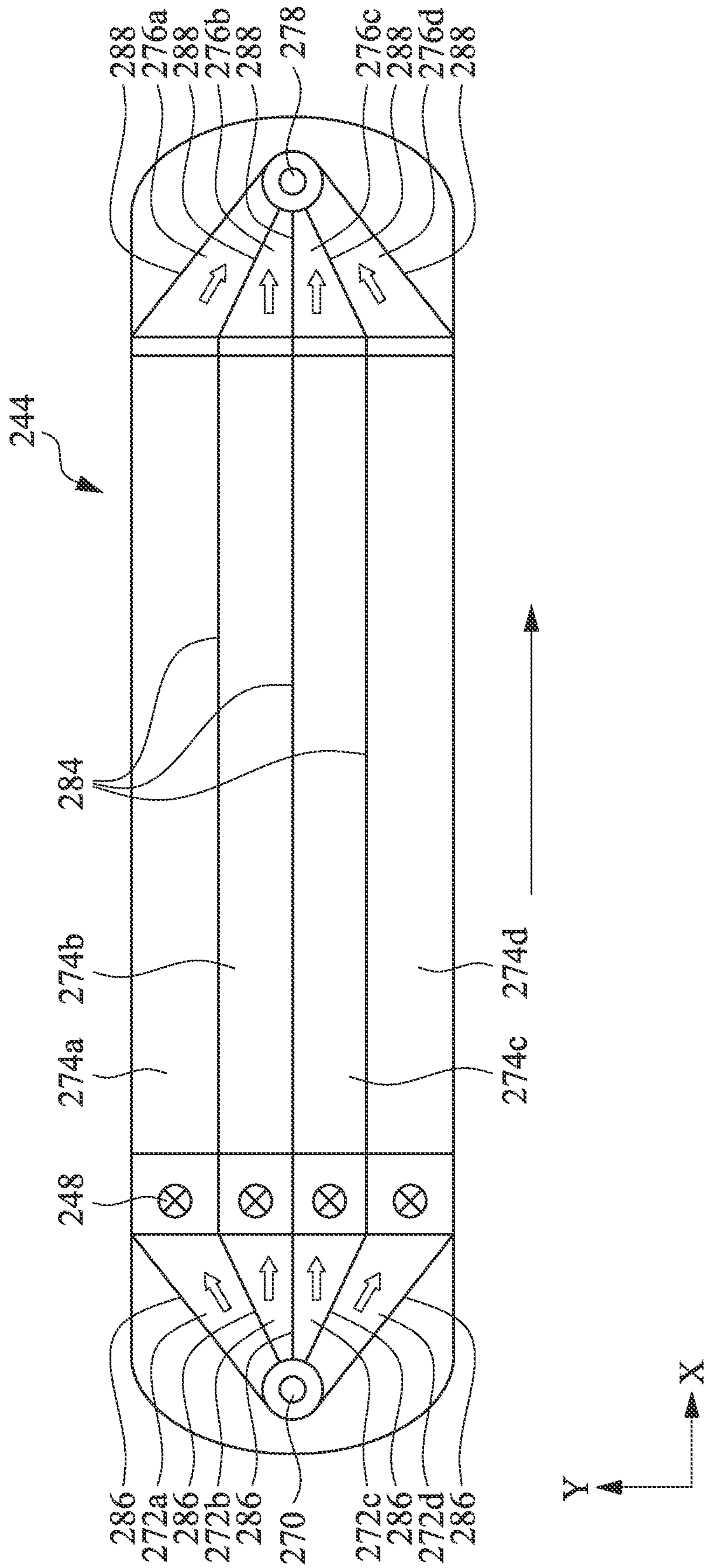
FIG. 9B is a top view of a microfluidic cartridge according to some embodiments of the present disclosure.
Figure 9C:
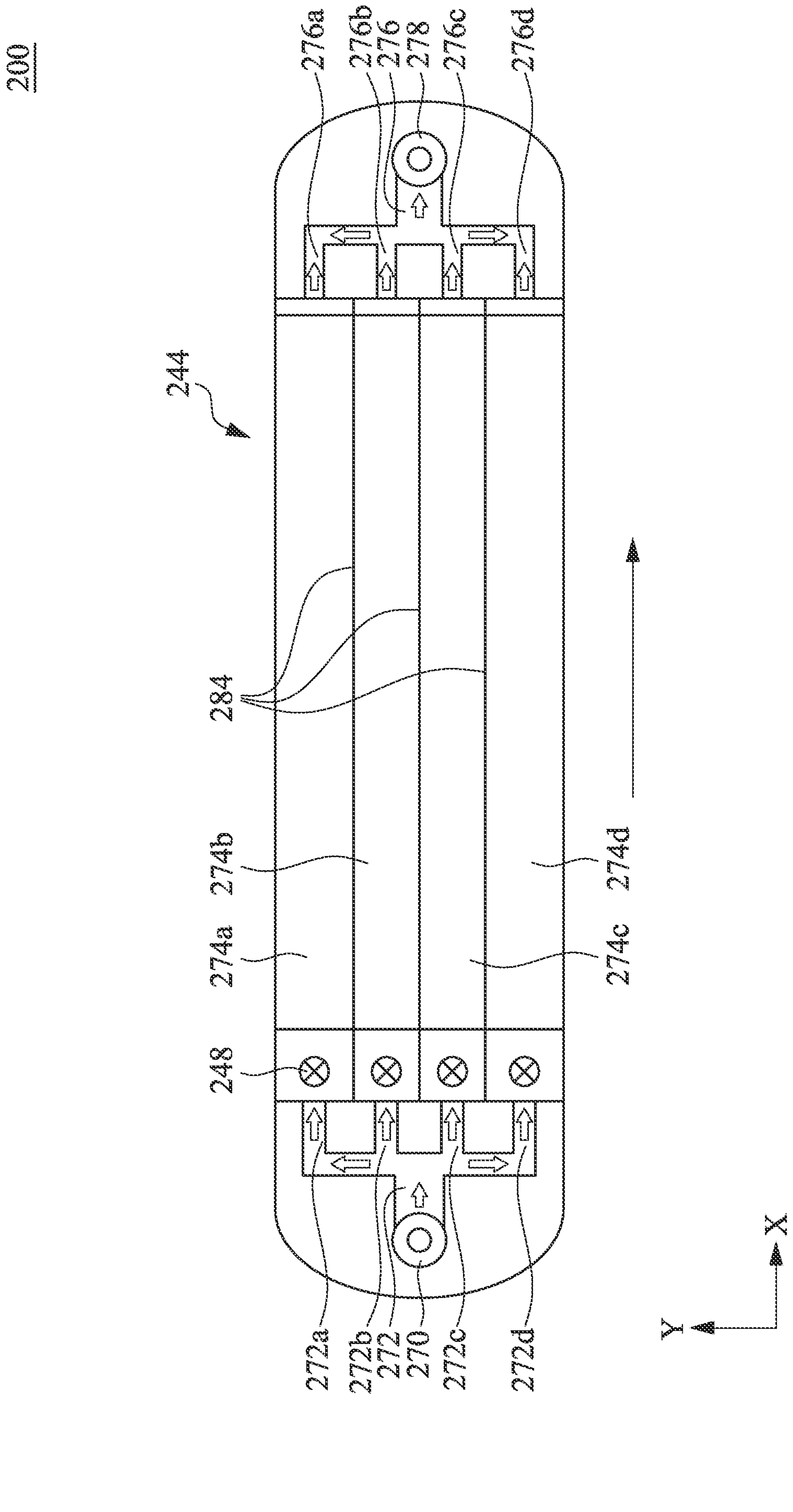
FIG. 9C is a top view of a microfluidic cartridge according to some embodiments of the present disclosure.

FIG. 6 illustrates a perspective view of a microfluidic cartridge according to some embodiments of the present disclosure. The microfluidic cartridge 200 is used for simultaneous analysis of multiple samples, especially in digital PCR amplification and quantitation of targets of interest of these samples on an automated instrument. The disclosed microfluidic cartridge 200 has multiple sample injection ports 248, multiple physically separated individual microfluidic channels (see FIGS. 9A-9C), an inlet port 270, and an outlet port 278, and a biochip 260 having a large number of microwells wherein sample partition occurs (see. FIGS. 9A-9C). The microfluidic cartridge 200 is assembled from a lower cartridge body 202, a biochip 260, and an upper cartridge body 204. The multiple sub-channels in the said microfluidic cartridge 200 are formed when the upper cartridge body 204 and the biochip 260 are bonded together, producing enclosed sub-channels, each of the sub-channels is connected with the inlet port 270, the outlet port 278, the respective sample injection port 248, fluidic channel, and microwells on the part of the biochip 260. The multiple sub-channels can used be for different samples or different targets of interest of the same sample in an assay process.

Figure 7:
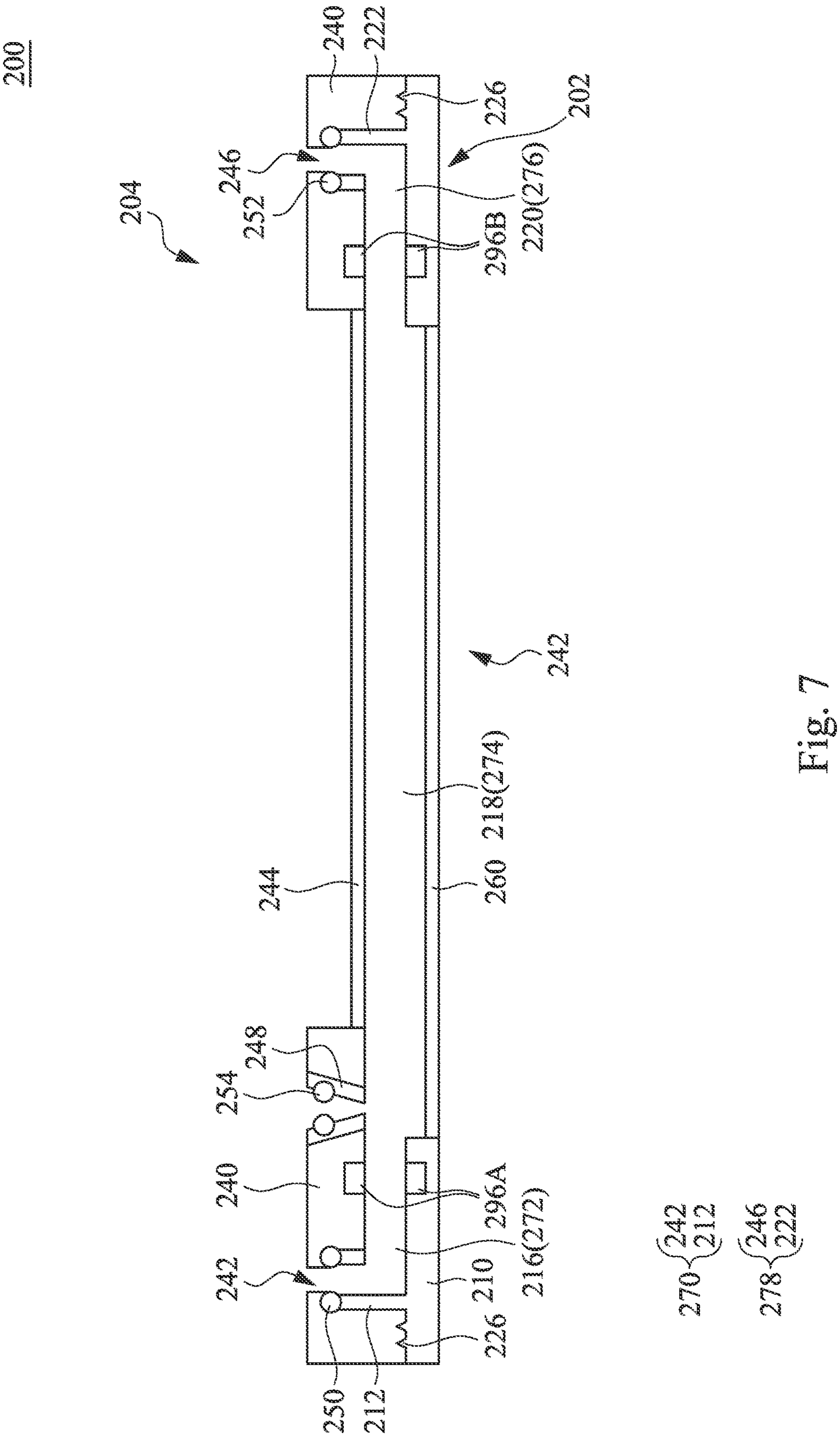
FIG. 7 is a cross-sectional view of a microfluidic cartridge according to some embodiments of the present disclosure.

FIG. 7 is a cross-sectional view along line C-C of FIG. 6. As shown in FIG. 7, the microfluidic cartridge 200 comprises the lower cartridge body 202, the upper cartridge body 204, and the biochip 260. The lower cartridge body 202 comprises a first substrate 210, an inlet column 212, an inflow trench 216, a biochip slot 218, an outflow trench 220, and an outlet column 222. The inlet column 212 is protruding above the first substrate 210. The inlet column 212 is a hollow structure. In addition, the outlet column 222 is also protruding above the first substrate 210. The outlet column 222 is a hollow structure. The inlet column 212, the inflow trench 216, the biochip slot 218, the outflow trench 220, and the outlet column 222 are connected in sequence. The biochip 260 is disposed in the biochip slot 218 of the lower cartridge body 202.

The upper cartridge body 204 comprises a second substrate 240, a first opening 242, an optical window 244, and a second opening 246. As shown in FIG. 7, the first opening 242 corresponds to the inlet column 212 of the lower cartridge body 202. The inlet column 212 is inserted into the first opening 242. The inlet column 212 of the lower cartridge body 202 and the first opening 242 of the upper cartridge body 204 are assembled into the inlet port 270. The inlet port 270 is configured to accommodate a pipette tip or a needle for transporting the fluid relating to digital PCR. The optical window 244 is disposed over the biochip 260. The optical window 244 is made of transparent material.

As shown in FIG. 7, the second opening 246 corresponds to the outlet column 222 of the lower cartridge body 202. The outlet column 222 is inserted into the second opening 246. The outlet column 222 of the lower cartridge body 202 and the second opening 246 of the upper cartridge body 204 are assembled into the outlet port 278. The outlet port 278 is configured to accommodate a pipette tip or a needle for transporting the fluid relating to digital PCR.

As shown in FIG. 7, the fluid channels of the microfluidic cartridge 200 are defined by the assembly of the lower cartridge body 202, upper cartridge body 204, and the biochip 260.

As shown in FIG. 7, the first O-ring 250 is disposed in the first opening 242 of the upper cartridge body 204 and abuts against the inlet column 212 of the lower cartridge body 202. A second O-ring 252 is disposed in the second opening 246 of the upper cartridge body 204 and abuts against the outlet column 222 of the lower cartridge body 202. These elastic O-rings serve as sealing elements to maintain the fluid or air flow control through the channel when the microfluidic cartridge 200 is coupled to connecting instruments, e.g., automated pipette tips or needles. The flow control via the fluid ports can affect the biological reactions on the biochip by pressure control, exchange of reagents, and other means.

After the lower cartridge body 202, the biochip 260, and the upper cartridge body 204 are assembled into the microfluidic cartridge 200, the fluid inflow channel 272 is defined by the inflow trench 216 and a lower surface of the second substrate 240, the reaction channel 274 is defined by the biochip 260 and a lower surface of the optical window 244, and the fluid outflow channel 276 is defined by the outflow trench 220 and the lower surface of the second substrate 240.

Figure 8:
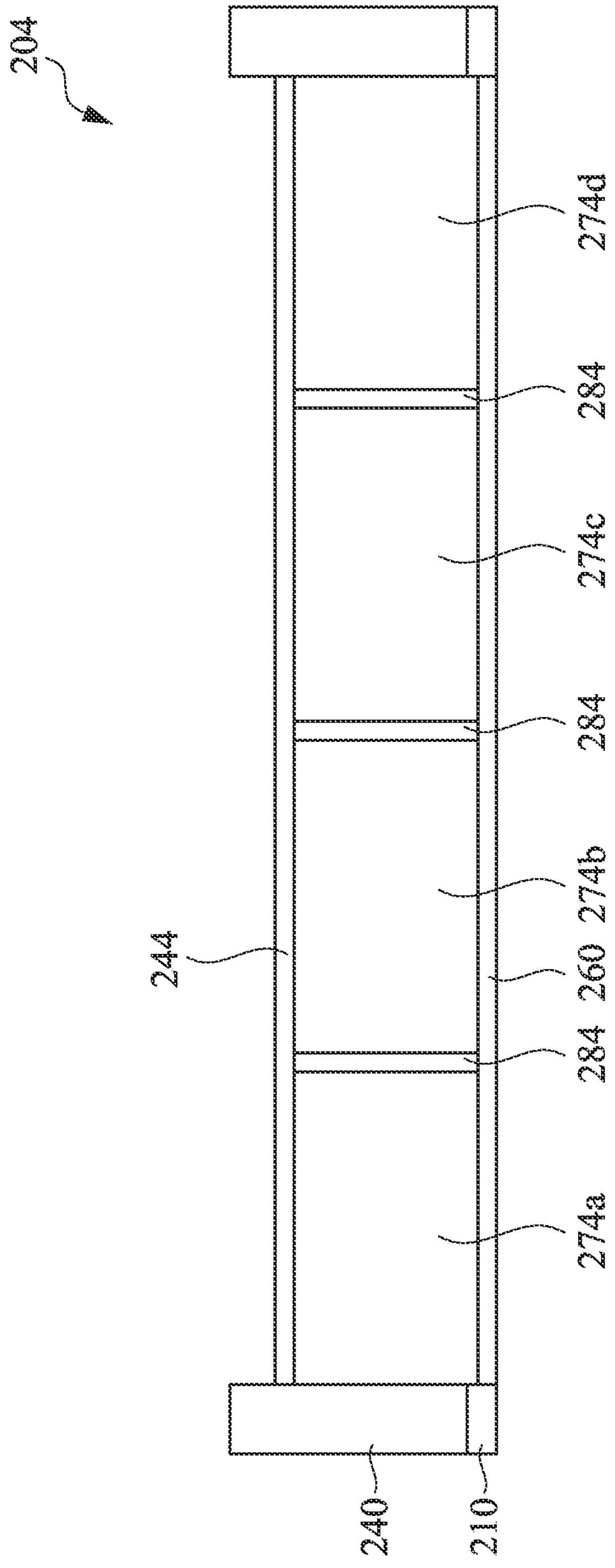
FIG. 8 is a cross-sectional view of a microfluidic cartridge according to some embodiments of the present disclosure.

FIG. 8 is a cross-sectional view along line D-D of FIG. 6. The upper cartridge body 204 further comprises multiple reaction channel spacers 284. Although FIG. 8 shows three reaction channel spacers 284, more or less of the reaction channels spacers 284 can also be implemented. The reaction channel spacers 284 are disposed on the lower surface of the upper cartridge body 204, and after the microfluidic cartridge 200 is assembled, the reaction channel 274 is physically divided into a plurality of reaction sub-channels 274*a*, 274*b*, 274*c*, and 274*d* by the reaction channel spacers 284. Such physical isolation of adjacent individual microfluidic sub-channels ensures that the sample analysis within each individual sub-channel proceeds independently, and is free from interference from other channels. In some embodiments, the cross dimension of the disclosed microfluidic sub-channels can be on the order of 5 μm, or 10 μm, or 100 μm, or 1000 μm, or even larger than 10,000 μm, and the outline of the cross section of the channel comprises rectangle, or square, or round, or other shapes. The number, cross dimension, or shape of the individual microfluidic sub-channels can vary according to needs, and a person of ordinary skill in the art should be able to produce design variations based on the disclosed design principle.

As shown in FIG. 9A, in some embodiments, the inflow trench 216, the outflow trench 220, and the reaction channel spacers 284 extend in a first direction (e.g., X direction), and the plurality of the sample injection ports 248 are arranged in the second direction (e.g., Y direction).

FIG. 9A is a top view of the microfluidic cartridge 200. In order to show the structure of the microfluidic cartridge 200 more clearly, the inflow trench 216 and the outflow trench 220 in the lower cartridge body 202 and the reaction channel spacers 284 in the upper cartridge body 204 are shown.

As shown in FIG. 9A, each of the individual microfluidic sub-channels 274*a*, 274*b*, 274*c*, and 274*d* comprises a sample injection port 248 positioned inside the respective sub-channel. Through the respective sample injection ports 248, the injected samples are guided toward the direction of the fluid outflow channel 276 and away from the fluid inflow channel 272. The solid arrow means the direction of the fluid. The hollow arrows mean the flow direction of the fluid for each of the sub-channels. The main function of the sample injection ports 248 is to allow the introduction of the sample into the individual microfluidic sub-channel and therein affect the directional flow of sample towards the fluid outflow channel 276. The geometric design of the sample injection ports 248 should be compatible with the sample injection implement, such as a pipette tip or customized needle, of an instrument wherein the microfluidic cartridge 200 is coupled to for the purpose of smooth and complete sample introduction during use. The aforementioned coupling between the said sample injection port 248 and the sample injection implement requires adequate sealing to overcome any resistance created inside the individual microfluidic sub-channel when the sample is introduced. In some embodiments, a plurality of injection port O-rings 254 are respectively disposed in the plurality of sample injection ports 248, as shown in FIG. 7.

In some embodiments, the said sample injection implement of the instrument comprises using a one-time-use disposable pipette tip that is routinely used in biological sample analysis to avoid potential sample cross contamination.

In some embodiments, as shown in FIG. 7, the individual microfluidic sub-channel also preferably comprises fluidics control features, shown by Fluidics Control 296A and Fluidics Control 296B, that help direct the liquid flow inside each individual sub-channel in the direction towards the fluid outflow channel 276. Various designs of these fluidics control features include, but not limited to, passive valves by varying geometry in the microfluidic channels, and have been summarized in Recent Advances of Fluid Manipulation Technologies in Microfluidic Paper-Based Analytical Devices (μPADs) toward Multi-Step Assays, by T. H. Kim et al., Micromachines 2020, 11, 269; herein incorporated as reference. These said fluidics control 296A and 296B, together with the fluidics control mechanism of the instrument, e.g., a syringe pump or an air compressor, etc., ensure to drive the parallel liquid flow in all individual sub-channels in the same direction during sample analysis process, i.e., from the fluid inflow channel 272 toward the fluid outflow channel 276 in the microfluidic cartridge 200.

As shown in FIG. 9A, in some embodiments, the inlet port 270 and the outlet port 278, as well as the fluid inflow channel 272 and the fluid outflow channel 276 are shared among all said individual microfluidic sub-channels. When the fluid inflow channel 272 is shared, shown as the triangular area on the left side of the microfluidic cartridge 200 in FIG. 9A, it comprises either a smooth shared surface or a structured shared surface, whereon inflow liquid from the inlet port 270 can flow freely into all connected sub-microfluidic channels. Similarly, when the fluid outflow channel 276 is shared, shown as the triangular area on the right side of the microfluidic cartridge 200 in FIG. 9A, it can comprise either a smooth or structured surface, whereon liquid outflow from all microfluidic sub-channels merge to form a continuous flow toward the outlet port 278. In other embodiments, the shared fluid inflow channel 272 and fluid outflow channel 276 can have different designs and features to facilitate uniform fluidics performance among different individual microfluidic channels.

FIG. 9B is another top view of the microfluidic cartridge 200 according to some embodiments. The microfluidic cartridge 200 further comprises a plurality inflow channel spacers 286 respectively connected with the reaction channel spacers 284. The inflow channel spacers 286 are configured to divide the fluid inflow channel 272 into a plurality of fluid inflow sub-channels 272*a*, 272*b*, 272*c*, and 272*d*. In some embodiments, the plurality inflow channel spacers 286 are defined in the lower cartridge body 202 and disposed on upper surface of the first substrate 210. In other embodiments, the plurality inflow channel spacers 286 are defined in the upper cartridge body 204 and disposed on lower surface of the second substrate 240. In some embodiments, each of the plurality inflow channel spacers 286 is continuous with a respective one of the reaction channel spacers 284.

As shown in FIG. 9B, the microfluidic cartridge 200 further comprises a plurality outflow channel spacers 288 respectively connected with the reaction channel spacers 284. The outflow channel spacers 288 are configured to divide the fluid outflow channel 276 into a plurality of fluid outflow sub-channels 276*a*, 276*b*, 276*c*, and 276*d*. In some embodiments, the plurality outflow channel spacers 288 are defined in the lower cartridge body 202 and disposed on upper surface of the first substrate 210. In other embodiments, the plurality outflow channel spacers 288 are defined in the upper cartridge body 204 and disposed on lower surface of the second substrate 240. In some embodiments, each of the plurality outflow channel spacers 288 is continuous with a respective one of the reaction channel spacers 284.

In some embodiments, the inlet port 270 and the outlet port 278 are shared, whereas the fluid inflow channel 272 and the fluid outflow channel 276 of the microfluidic cartridge 200 are not shared among said individual microfluidic sub-channels, producing the microfluidic cartridge 200 with individual inflow sub-channels and individual outflow sub-channels that are connected to respective individual microfluidic channels for liquid communication, resulting in complete physically isolated individual channels between common inlet port 270 and outlet port 278, as illustrated in FIG. 9B. A person of ordinary skill in the art can also produce microfluidic cartridge having multiple sub-channels with other design combinations of the inflow and outflow channels in terms of their common or compartmentalized functionality.

FIG. 9C is another top view of the microfluidic cartridge 200 according to some embodiments. The microfluidic cartridge 200 has multiple sub-channels and shared inlet port 270 and shared outlet port 278. The fluid inflow channel 272 is divided into a plurality of fluid inflow sub-channels 272*a*, 272*b*, 272*c* and 272*d*. Each of the fluid inflow sub-channels 272*a*, 272*b*, 272*c*, and 272*d* is connected to a corresponding one of the reaction sub-channels 274*a*, 274*b*, 274*c* and 274*d*. In some embodiments, the shapes (or the patterns) of the fluid inflow channel 272 and the fluid inflow sub-channels 272*a*, 272*b*, 272*c* and 272*d* are defined in the lower cartridge body 202 and disposed on upper surface of the first substrate 210.

As shown in FIG. 9C, a plurality of fluid outflow sub-channels 276*a*, 276*b*, 276*c* and 276*d* are converged to the fluid outflow channel 276. Each of the fluid outflow sub-channels 276*a*, 276*b*, 276*c*, and 276*d* is connected to a corresponding one of the reaction sub-channels 274*a*, 274*b*, 274*c* and 274*d*. In some embodiments, the shapes (or the patterns) of the fluid outflow sub-channels 276*a*, 276*b*, 276*c* and 276*d* and the fluid outflow channel 276 are defined in the lower cartridge body 202 and disposed on upper surface of the first substrate 210.

In some embodiments, the fabrication methods for making the microfluidic cartridge 200 can be injection molding, CNC machining and 3D printing, etc. In some embodiments, the microfluidic cartridge 200 is fabricated by bonding of different parts or sections by techniques known in the field, such as by ultrasound wielding or by adhesives, etc. The materials of choice for the microfluidic cartridge 200 are required to be compatible with biological samples under investigation and preferably low optical detection background, for example, glass, silicon, polymeric materials such as PMMA or polypropylene, etc. The microfluidic cartridge 200 should also be able to withstand the conditions of the analysis process, including chemical and temperature changes.

This disclosed microfluidic cartridge 200 is used for assays of multiple samples which are isolated in respective individual microfluidic sub-channels; or multiple assays of the same sample that are isolated in individual microfluidic channels with a subset of analytes being analyzed within a particular sub-channel.

Figure 10:
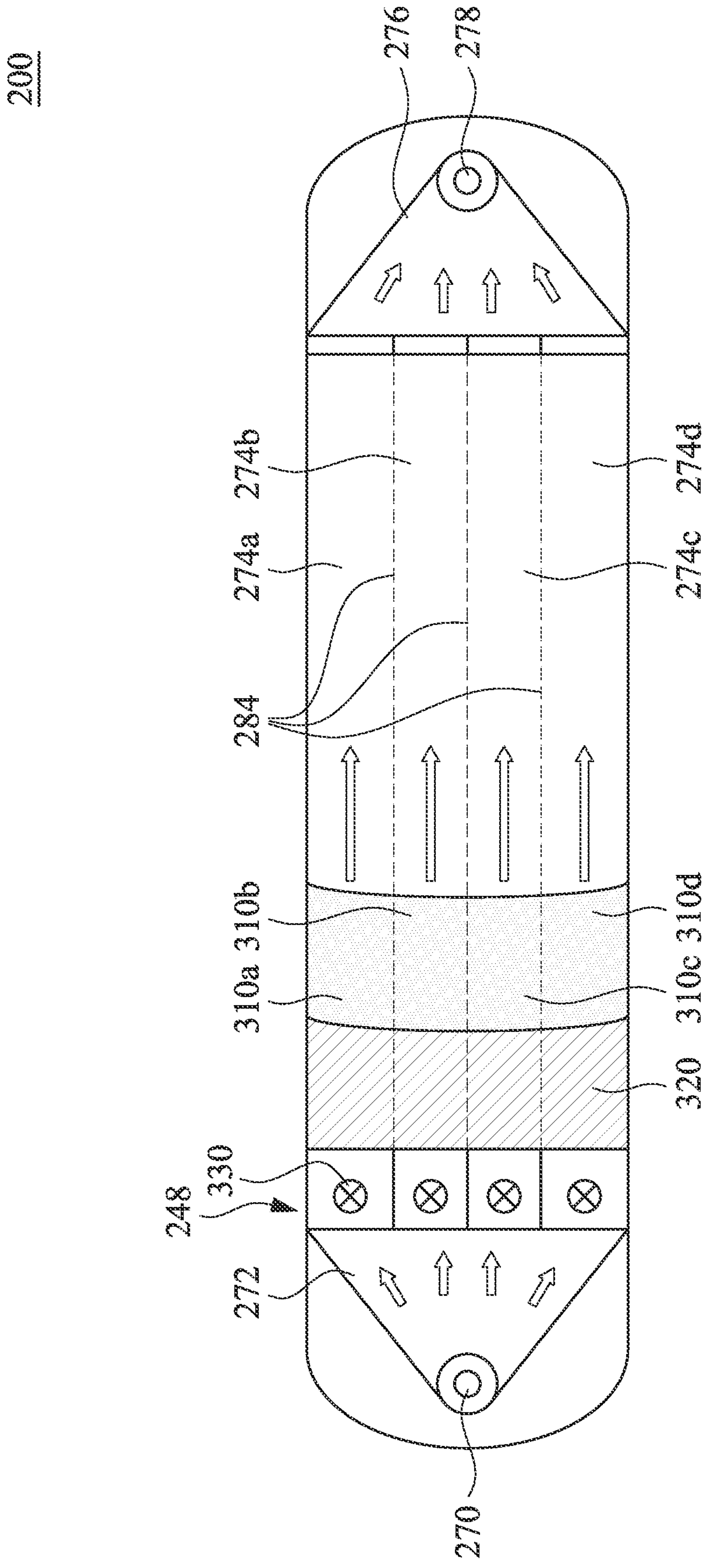
FIG. 10 is a cross-sectional view of a microfluidic cartridge according to some embodiments of the present disclosure.

In some embodiments, the said assay is a digital PCR (dPCR) based assay where the sample and PCR reagent mixture is partitioned in a large number of microwells of the biochip inside an individual microfluidic sub-channel of the microfluidic cartridge; and wherein each of the microwells is physically isolated from neighboring microwells by an water immiscible liquid at the top opening; and during an ensuing analysis process, temperature regulation is applied to the biochip 260 of the microfluidic cartridge 200 on an instrument for target amplification and detection. FIG. 10 is an illustration of the sample distribution process inside individual microfluidic sub-channels of the microfluidic during a digital PCR assay. The digital PCR assay in the microfluidic cartridge 200 is carried out on an automated instrument and comprises the following steps:

(1) Sample injection: 4 aqueous samples 310*a*, 310*b*, 310*c*, 310*d* are injected into the respective individual reaction sub-channels 274*a*, 274*b*, 274*c*, 274*d* through the respective sample injection ports 248.

(2) Sealing of sample injection ports: the sample injection ports 248 are sealed by a sealing element 330 after the samples are injected into the microfluidic cartridge 200, in order to prevent liquid and/or air leakage during the ensuing process.

(3) Sample partition inside individual reaction sub-channels: the aforementioned samples 310*a*, 310*b*, 310*c*, 310*d* gradually fill the microwells of the biochip 260 as they are pushed along the individual microfluidic channels by a water immiscible hydrophobic liquid 320 that is introduced into the individual microfluidic channels through the shared inflow channel at left side of the cartridge. The hydrophobic liquid 320 seals and isolates all microwells over the top of the biochip as it flows along the microfluidic channels towards the shared outflow channel and liquid outlet port. This process results in samples 310*a*, 310*b*, 310*c*, 310*d* being evenly partitioned in the microwells within physically separated reaction sub-channels 274*a*, 274*b*, 274*c*, 274*d* and completely isolated from neighboring microwells by the hydrophobic liquid 320.

(4) Digital PCR target amplification and analysis: a bottom side of the biochip of the microfluidic cartridge 200 is then subjected to temperature regulation and/or other chemical or physical conditions to enable the target amplification and the ensuing signal analysis, to elucidate the composition and quantity of the targets of interest in the samples.

During the sample distribution process, the sample volume gradually reduces as it fills the microwells of the biochip, with any residual volume being flushed out of the microfluidic cartridge 200 through the outflow channel and liquid outlet port. Various methods for sealing the said sample injection ports can be used for the aforesaid purpose in step (2), including adhesive tapes, heat or UV initiated adhesives, or a mechanical plunger-like implement of the instrument on which the microfluidic cartridge 200 is used. Other factors such as flow rate and pressure with which the hydrophobic liquid is introduced into the cartridge significantly impact the efficiency of the sample partition within the microwells. Targets of interest in the samples can be identified and quantified by statistic analysis of the amplification signals from those microwells of the biochip, giving rise to results of multiple samples in a single assay.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A microfluidic cartridge, comprising:
a lower cartridge body, comprising:
a first substrate; and
an inlet column, protruding above the first substrate, wherein the inlet column is hollow;
a biochip, attached to the first substrate of the lower cartridge body; and
an upper cartridge body, disposed over the lower cartridge body, wherein the upper cartridge body comprises:
a second substrate;
a first opening, penetrating the second substrate, wherein the inlet column of the lower cartridge body is inserted into the first opening, the inlet column and the first opening are assembled into an inlet port, and the inlet port is configured to accommodate a tip or a needle for transporting a reaction fluid; and
a first O-ring, disposed in the first opening, wherein the first O-ring is disposed over the inlet column of the lower cartridge body and above a bottom surface of the second substrate of the upper cartridge body, and the first O-ring is configured to serve as a sealing element when the tip or the needle for transporting the reaction fluid is inserted into the inlet port.

2. The microfluidic cartridge of claim 1, wherein the microfluidic cartridge further comprises a reaction channel, and the reaction channel is defined by a bottom surface of the second substrate and the biochip.

3. The microfluidic cartridge of claim 2, wherein the microfluidic cartridge further comprises a fluid inflow channel, the fluid inflow channel connects the inlet port and the reaction channel, and the fluid inflow channel is defined by a top surface of the first substrate and the bottom surface of the second substrate.

4. The microfluidic cartridge of claim 1, wherein the first O-ring directly contacts a first inner wall in the first opening.

5. The microfluidic cartridge of claim 1, wherein the first O-ring is fixed in the first opening via mechanical restraints or adhesives.

6. The microfluidic cartridge of claim 1, wherein the lower cartridge body further comprises:
an inflow trench, connected with the inlet column; and
a biochip slot, connected with the inflow trench, wherein the biochip is disposed in the biochip slot.

7. The microfluidic cartridge of claim 6, wherein the inflow trench has a first width, the biochip slot has a second width, and the first width is smaller than the second width.

8. The microfluidic cartridge of claim 6, wherein a top surface of the biochip is lower than a bottom surface of the inflow trench.

9. The microfluidic cartridge of claim 6, wherein the inflow trench is defined by welding lines.

10. The microfluidic cartridge of claim 1, wherein the biochip comprises a plurality of microwells, and a number of the microwells is at least 1,000.

11. A microfluidic cartridge, comprising:
a lower cartridge body, comprising:
a first substrate;
an inflow trench and an outflow trench, disposed in the first substrate and extending in a first direction; and
a biochip slot, wherein the inflow trench, the biochip slot, and the outflow trench are connected;
a biochip, disposed in the biochip slot and between the inflow trench and the ourflow trench; and an upper cartridge body, disposed over the lower cartridge body, wherein the upper cartridge body comprises:
- a second substrate, wherein the inflow trench and a bottom surface of the second substrate defines a fluid inflow channel;
- a first opening, penetrating the second substrate and connecting to the fluid inflow channel;
- an optical window, disposed over the biochip, wherein a lower surface of the optical window and the biochip define a reaction channel;
- a plurality of sample injection ports disposed between the first opening and the optical window in the first direction; and
- at least one reaction channel spacer, disposed on a lower surface of the upper cartridge body, wherein the at least one reaction channel spacer extends in the first direction and divides the reaction channel into a plurality of reaction sub-channels, wherein the plurality of sample injection ports are separated by the at least one reaction channel spacer and configured for different samples respectively being injected into a respective sub-channel of the plurality of reaction sub-channels.

12. The microfluidic cartridge of claim 11, wherein each of the plurality of the sample injection ports is disposed in the respective sub-channel of the plurality of reaction sub-channels.

13. The microfluidic cartridge of claim 11, further comprising:

at least one inflow channel spacer, wherein the at least one inflow channel spacer is configured to divide the fluid inflow channel into a plurality of fluid inflow sub-channels.

14. The microfluidic cartridge of claim 11, wherein each of the plurality of sample injection ports is sealable by a sealing element.

15. The microfluidic cartridge of claim 11, further comprising:

a plurality of injection port O-rings, respectively disposed in the plurality of sample injection ports.

16. A microfluidic cartridge, comprising:

a lower cartridge body, comprising:
- a first substrate;
- an inflow trench and an outflow trench, disposed in the first substrate, wherein a bottom surface of the inflow trench and a bottom surface of the outflow trench is a upper surface of the first substrate; and
- a biochip slot, wherein the inflow trench, the biochip slot, and the outflow trench are connected;

an upper cartridge body, disposed over the lower cartridge body, wherein the upper cartridge body comprises:
- a second substrate, wherein the inflow trench and a bottom surface of the second substrate defines a fluid inflow channel;
- a first opening, penetrating the second substrate and connecting to the fluid inflow channel; and
- an optical window; and a biochip, disposed in the biochip slot, between the inflow trench and the ourflow trench and under the optical window, wherein a material of the biochip is different from a material of the first substrate, the biochip has a plurality of microwells, a lower surface of the optical window and the biochip define a reaction channel, and an upper surface of the biochip is lower than the bottom surface of the inflow trench and the bottom surface of the outflow trench.

17. The microfluidic cartridge of claim 16, wherein each of bottom surfaces of the microwells is hydrophilic.

18. The microfluidic cartridge of claim 16, wherein the biochip comprises a silicon layer, and the plurality of microwells are recesses of the silicon layer.

19. The microfluidic cartridge of claim 16, wherein the biochip comprises:

a thermal conductive layer; and a patterned layer, disposed on the thermal conductive layer, wherein the patterned layer comprises a plurality of through holes.

20. The microfluidic cartridge of claim 19, wherein the thermal conductive layer comprises gold, copper, aluminum, iron, steel, silicon, graphite, or graphene, and the patterned layer comprises glass, silicon, or polymer.

* * * * *